United States Patent [19]

Huber et al.

[11] Patent Number: 5,090,757
[45] Date of Patent: Feb. 25, 1992

[54] ARRANGEMENT FOR THE HANDLING OF COMPONENTS WITH A GRIPPING DEVICE

[75] Inventors: Thomas Huber, Triberg; Ralf Huber, Brigachtal, both of Fed. Rep. of Germany

[73] Assignees: Stiwa-Fertigungstechnik Sticht Gesellschaft m.b.H., Attnang-Puchheim, Austria; a part interest; GAS Gesellschaft für Antriebs- und Steuerungstechnik mbH & Co. KG, St. Georgen/Schwarzwald, Fed. Rep. of Germany; a part interest

[21] Appl. No.: 504,969

[22] Filed: Apr. 4, 1990

[30] Foreign Application Priority Data

Apr. 4, 1989 [AT] Austria ............................ 790/89

[51] Int. Cl.⁵ ..................... B25J 15/08; B25J 19/02
[52] U.S. Cl. ..................... 294/88; 294/119.1; 294/907; 414/751; 901/37; 901/46
[58] Field of Search ............ 294/119.1, 88, 907, 294/86.4, 103, 106; 901/37, 9, 46, 31–35; 116/200, 209, 281, 334; 269/32, 34; 414/730, 741, 751

[56] References Cited

U.S. PATENT DOCUMENTS

| | | | |
|---|---|---|---|
| 3,952,880 | 4/1976 | Hill et al. | 901/46 X |
| 4,369,872 | 1/1983 | Sticht | 198/345.3 |
| 4,647,100 | 3/1987 | Lessway | 294/119.001 |
| 4,716,647 | 1/1988 | Winkler et al. | 901/37 |
| 4,723,503 | 2/1988 | Yuda | 901/46 X |
| 4,729,588 | 3/1988 | Kratzer | 294/119.001 X |
| 4,741,568 | 5/1988 | Barcea et al. | 294/88 |
| 4,744,596 | 5/1988 | Hiller et al. | 294/88 |
| 4,752,094 | 6/1988 | Tabeau | 901/46 X |
| 4,783,107 | 11/1988 | Parker et al. | 294/88 |
| 4,865,375 | 9/1989 | Laub et al. | 294/88 |
| 4,913,481 | 4/1990 | Chin et al. | 294/88 |

Primary Examiner—Johnny D. Cherry
Attorney, Agent, or Firm—Collard, Roe & Galgano

[57] ABSTRACT

The invention describes an arrangement (1) for the handling of components (2) with a gripping device (3) which is displaceably mounted via a displacing drive (10) along a guide path (8). The gripping device (3) comprises two gripper fingers (28,29) which are displaceable relative to each other, and an adjusting drive (6) and also a measuring device (44). Associated with a gripper finger (28,29) is an adjusting element (34), which is connected via a link arrangement (39) with the gripper finger (28,29). The adjusting element (34) is displaceably mounted along a guide path or respectively its guide columns (26,27) aligned vertically to the guide path of the gripper finger (28,29), and is movably connected with the adjusting drive (6).

11 Claims, 4 Drawing Sheets

ARRANGEMENT FOR THE HANDLING OF COMPONENTS WITH A GRIPPING DEVICE

The invention relates to an arrangement for the handling of structural parts with a gripping device, which is displaceably mounted via a displacing drive along a guide path, and which has two gripper fingers which are displaceable relative to each other, and has an adjusting drive, in particular fluid operated, and a measuring device.

Various arrangements are already known for the handling of structural parts, with different gripping devices—in accordance with U.S. Pat. No. 5,007,796 and U.S. Pat. No. 4,369,872 of the same applicant. Thus from U.S. Pat. No. 5,007,796 a parallel gripper arrangement is known, in which the two gripper fingers which are movable towards each other are slidably mounted on a common guide path running perpendicularly to the axis of the driving device. The guide path is arranged in a supporting housing which has an approximately U-shaped cross-section. Between the two gripper fingers a cogwheel is arranged, which is in engagement with serrated slats arranged on the two gripper fingers and running parallel to the guide path. An electric motor, for example a stepping motor, is provided as an adjusting drive, with which the cogwheel can be rotated. Depending on the rotation of the cogwheel, the two gripper fingers are moved apart or respectively towards each other. Thereby, a parallel gripper is created. For the application of holding forces or greater tensional forces, the adjusting drive must always be acted upon by force, whereby heating arises in the electric motor drive, or high-output motors have to be used, which entail relatively high costs.

Furthermore, it is also known to use fluid operated adjusting drives, for example pressure medium cylinders for the displacement of the gripper fingers. For the placement of the grippers free from play against the adjusting drive, spring elements are provided, which tire as the duration of operation progresses, and therefore can not always make possible an exact abutment free from play or respectively moving connection between the adjusting drive and the gripper finger.

The present invention is based on the problem of creating an arrangement for the handling of structural parts with a displaceable gripping device, which makes possible an exact displacement of gripper fingers, movable parallel to each other, even over a long period of use and the construction of which is simple and favourable as regards cost.

This problem of the invention is solved in that an adjusting element is associated with a gripper finger, which adjusting element is connected via a link arrangement with the gripper finger, and is slidably mounted along a guide path aligned perpendicularly to the guide path of the gripper finger and is movably connected with the adjusting drive. The surprising advantage of this solution lies in that through the adjusting element, which is displaceable perpendicularly to the guide path of the gripper fingers to the narrowest space, a precise actuation of the gripper finger and hence a displacement movement, accurate to size, of the gripper fingers is made possible. In addition to this is the fact that through this arrangement, a space-saving construction can be created, so that a gripping device of this type is also abe to be used advantageously in cramped space conditions, in particular in assembly machines.

Furthermore, it is also possible that on the adjusting drive and on the supporting housing a further part of the measuring device is arranged and that the measuring device is constructed as a line or measuring device, whereby the gripping device can be used simultaneously for checking the dimensions such as diameter, lengths and the like of the structural part grasped by the gripping device.

It is, furthermore, advantageous if both gripper fingers are slidably arranged on the guide path and are movably connected with the adjusting element, because thereby the times for grasping or releasing a structural part can be shortened through the double relative movement.

According to another embodiment, provision is made that the part of the measuring device arranged on the adjusting device is formed by a transparent scale and a measured value pickup, associated therewith is arranged on the supporting housing, whereby an exact determining of the distance between the two gripper fingers is possible through monitoring the movement of a single part, and no cable connections are necessary between parts which are movable relative to each other.

However, it is also possible that the measured value pickup, is arranged in a section, in particular U-shaped, which penetrates a shank of the supporting housing and the adjusting element and the glass scale connected therewith is arranged between the shanks of the section, whereby a protected arrangement of the measuring device is achieved.

It is, furthermore, advantageous if each of the two gripper fingers Is slidably mounted on its own guide path and between these the adjusting element is preferably arranged with the guide path associated therewith, because thereby an even more compact construction of the gripping device can be achieved and, in addition, small moving masses suffice for the actuation of the gripper fingers.

Furthermore, it is also possible that the supporting housing is formed by a section with an approximately U-shaped cross-section and preferably the two shanks of the U-section are connected with each other in their end region, at a distance from the base, via a bracing cross-piece, whereby a rigid, oscillation-free bearing for the gripper fingers is achieved.

Moreover, it is also possible that the guide path supporting the adjusting element is arranged approximately perpendicularly to the base and preferably the guide columns forming the latter are mounted on the bracing cross-piece, whereby an oscillation-free supporting of the guide columns of the guide path for the adjusting element and hence a high degree of guiding accuracy thereof is achieved.

According to another embodiment, provision is made that the guide path or guide columns supporting the gripper fingers is arranged parallel to the base of the supporting housing, whereby a further stiffening of the U-shaped section forming the supporting housing is achieved and hence an exact parallel course of the gripper fingers is ensured.

However, it is also possible that on the side of the base facing away from the guide path for the adjusting element, the fluid operated adjusting drive is arranged, whereby short displacement paths of the displacing drive can be obtained and a compact structural unit can be created.

It is, furthermore, advantageous if in a housing holding the fluid operated adjusting drive a valve arrangement is arranged, which is situated in front of the adjusting drive, because thereby an exact actuation of the displacing drive and a sensitive controlling thereof is able to be achieved.

According to another embodiment, provision is made that the housing holding the adjusting drive has a length and a width which are equal to or smaller than the length and width of the base of the supporting housing, whereby the space requirement for such a gripping device can be kept small.

However, it is also possible that interchangeable gripper inserts are arranged on the gripper fingers, whereby such a gripper device of standard construction can be rapidly adapted to different structural parts which are to be grasped, without any alterations having to be made to the accuracy of operation or to the measuring device or the like.

However, it is also advantageous if a measured value pickup with a pressure- and/or force- and/or motion sensor e.g. a wire strain gauge, a path measuring element, a pressure element or the like is arranged on the gripper insert and/or on the gripper surface, because thereby the grasping of structural parts by the gripping device is sensed and, damage to the structural parts through too high forces on grasping the structural parts can be prevented.

However, it is also possible that the measured value pickup is arranged between the adjusting element or the adjusting drive, whereby the forces or movements between the various parts of the gripping device can be monitored at various sites.

Furthermore, it is also possible that the housing holding the adjusting drive supports a control module or is connected therewith via an insertable and detachable coupling device, whereby the control signals necessary for the actuation of the adjusting device are monitored directly in the region of the adjusting drive and can be processed, and hence both the expenditure on installation and also the switching times can be additionally shortened.

However, it is also advantageous if the valve arrangement which is associated with the adjusting drive, is formed by a servo valve, whereby a sensitive regulation and a positioning of the gripper fingers which is accurate to size is possible.

According to another embodiment, it is possible that the piston surface associated with the piston rod of the adjusting drive is only half as big as the piston surface lying opposite thereto, and that the piston face facing the piston rod is always acted upon with the full pressure of the fluid operated supply system, whereas the pressure in the cylinder chamber facing the piston surface lying opposite is able to be altered for the setting and/or positioning of the gripper fingers, whereby only through altering the pressure ratio in a cylinder chamber can a very sensitive and exact displacement of the gripper fingers be achieved, which makes possible a simple positioning which is accurate to size.

Finally, it is also possible that the coupling device has coupling elements for further measured value pickups such as, for example, force- or pressure sensors, temperature sensors or the like, arranged in addition to the linear or measuring device, whereby the measured values which are determined through the additional measured value pickups can be processed directly in the control module.

For a better understanding of the invention, the latter is explained in further detail hereinbelow with the aid of the preferred embodiments shown in the drawings.

Figure 1:
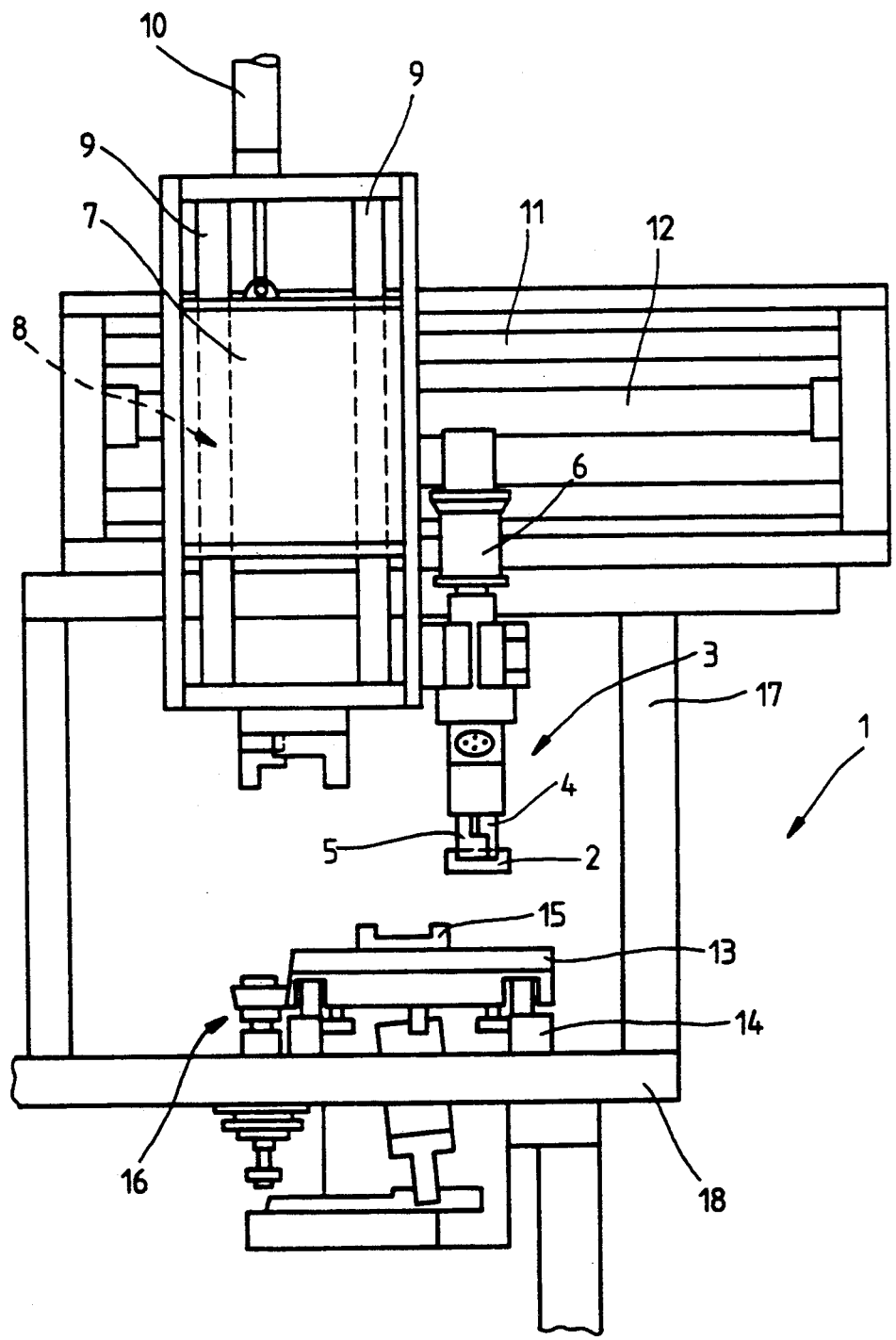
FIG. 1 shows an arrangement for the handling of structural parts with a gripper device constructed according to the invention and disposed in a manufacturing installation for the assembly of workpieces, in side view and in simplified diagrammatic representation partially in section.

In FIG. 1 an arrangement 1 is shown for the handling of components 2. A gripping device 3 serves for the grasping of the structural parts which device has gripper fingers 4,5 to grasp the structural parts 2, which are displaceable towards each other and apart from each other via a fluid operated adjusting drive 6. The gripping device 3 is mounted so as to be adjustable along a guide path 8, formed by guide bushes in an intermediate support 7, by means of guide columns 9 via a displacing drive 10. The intermediate support 7 may, in turn, be displaced along a guide path 11, which preferably runs perpendicularly to the guide path 8 by means of a further adjusting drive 12, not only in vertical direction with respect to a workpiece support 13, but also in a horizontal direction, but transversely to a guide path 14 of the workpiece support 13. On the workpiece support 13, mountings 15 may be arranged for the positioning of structural parts 2 during assembly. The movement of the workpiece support 13 along the guide path 14 takes place for example via a friction roller drive 16. The guide paths 8 and 11 forming the handling axes may be supported by a supporting frame 17 on a machine table 18, which also supports the guide path 14 for the workpiece support 13.

Figure 2:
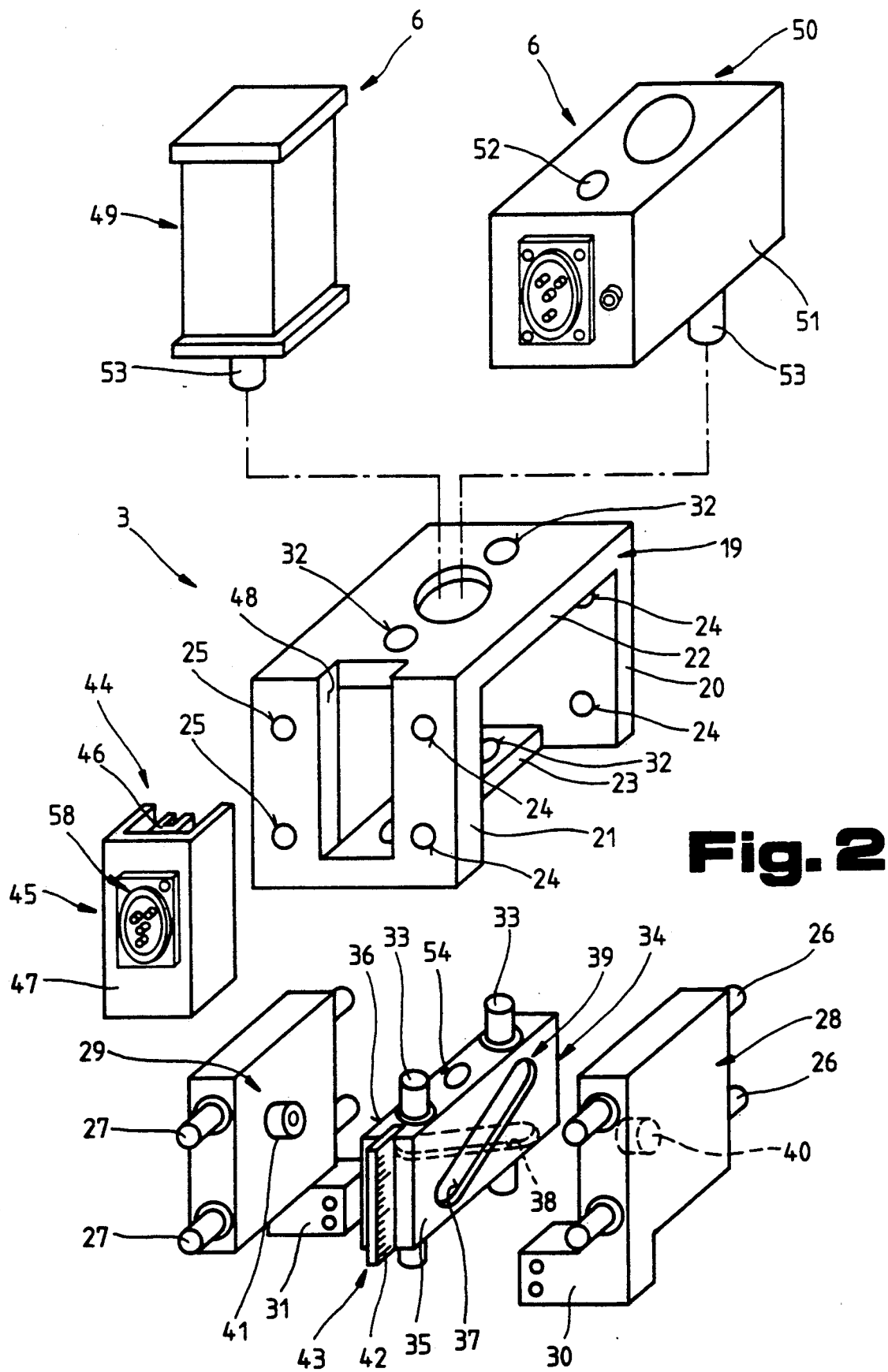
FIG. 2 shows the gripper device, in greatly simplified exploded representation.

In FIG. 2, the gripping device 3 is Illustrated. This gripping device 3 comprises a U-shaped supporting housing 19, the shanks 20, 21 of which are connected with each other at their ends remote from base 22, by bracing cross-piece 23. In the supporting housing 19, mounting bores 24,25 for guide columns 26, 27 are arranged. Along these guide columns 26,27 gripper fingers 28,29 with gripper inserts 30,31 are slidably arranged. In the supporting cross-piece 23 and in the base 22, mounting bores 32 are provided, in which guide columns 33 for an adjusting element 34 are secured. In the adjusting element 34, on both lateral faces 35,36 facing the gripper fingers 28,29, connecting link guide paths 37,38 of a link arrangement 39 are arranged. Associated with these connecting link guide paths 37,38 are sliding blocks 40,41, which are connected with the gripper fingers 28,29, which blocks engage connecting link guide paths 37,38 and are guided therein. The connecting link guide paths 37,38, which are arranged on the adjusting element 34, run for the oppositely directed displacement of the gripper fingers 28,29 on movement therewith approximately in an X-shape, the connecting link guide paths 37,38 forming identical diagonals in the adjusting element 34 between the guide columns 33.

On the adjusting element 34, in addition, a transparent scale 42 is arranged, which forms a part 43 of a measuring device 44. A further part 45 of this measuring device 44 is formed by a displacement pickup 46, which is arranged on a U-shaped section 47, which is disposed in recess 48 of shank 21 of the supporting housing 19. On the base 22 of the supporting housing 19, the fluid operated adjusting drive 6 is arranged, which, as illustrated diagrammatically, may merely be formed by a cylinder/piston arrangement 49, or, example by a cylinder/piston arrangement 50, which may be arranged in a housing 51 together with a valve arrangement 52. The adjusting drive 6 is secured on the side of the base 22 facing away from the adjusting element 34, and a piston rod 53 is fixed in a recess 54 of the adjusting element 34.

Figure 4:
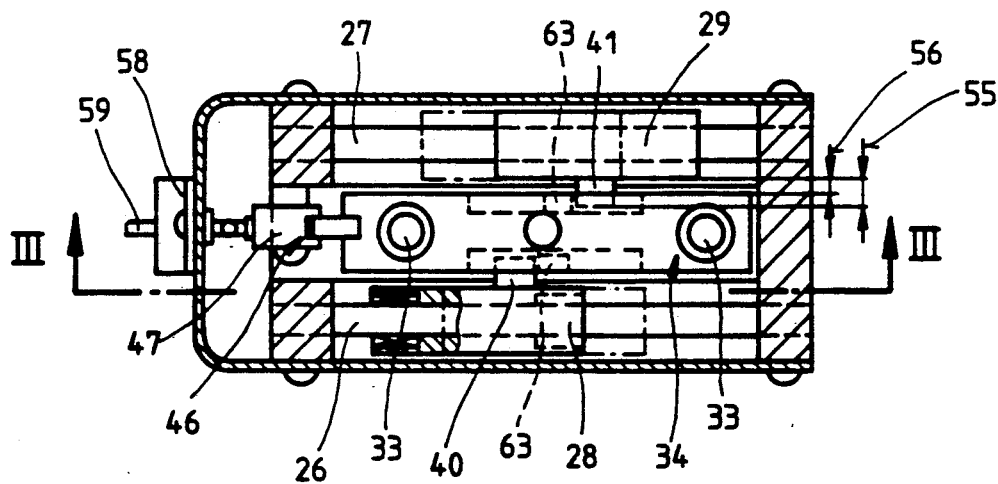
FIG. 4 shows the gripper device in section along line IV—IV of FIG. 3.

From FIG. 4 it can be seen that length 55 of the sliding blocks 40,41 is greater than distance 56 between the gripper fingers 28,29 and the adjusting element 34. Guide columns 26,27 for the gripper fingers 28,29 are arranged at a corresponding distance, so that the distance 56 can be maintained, and adjusting element 34 is freely movable in a direction running vertically to the guide columns 26,27 along the guide columns 33.

Figure 3:
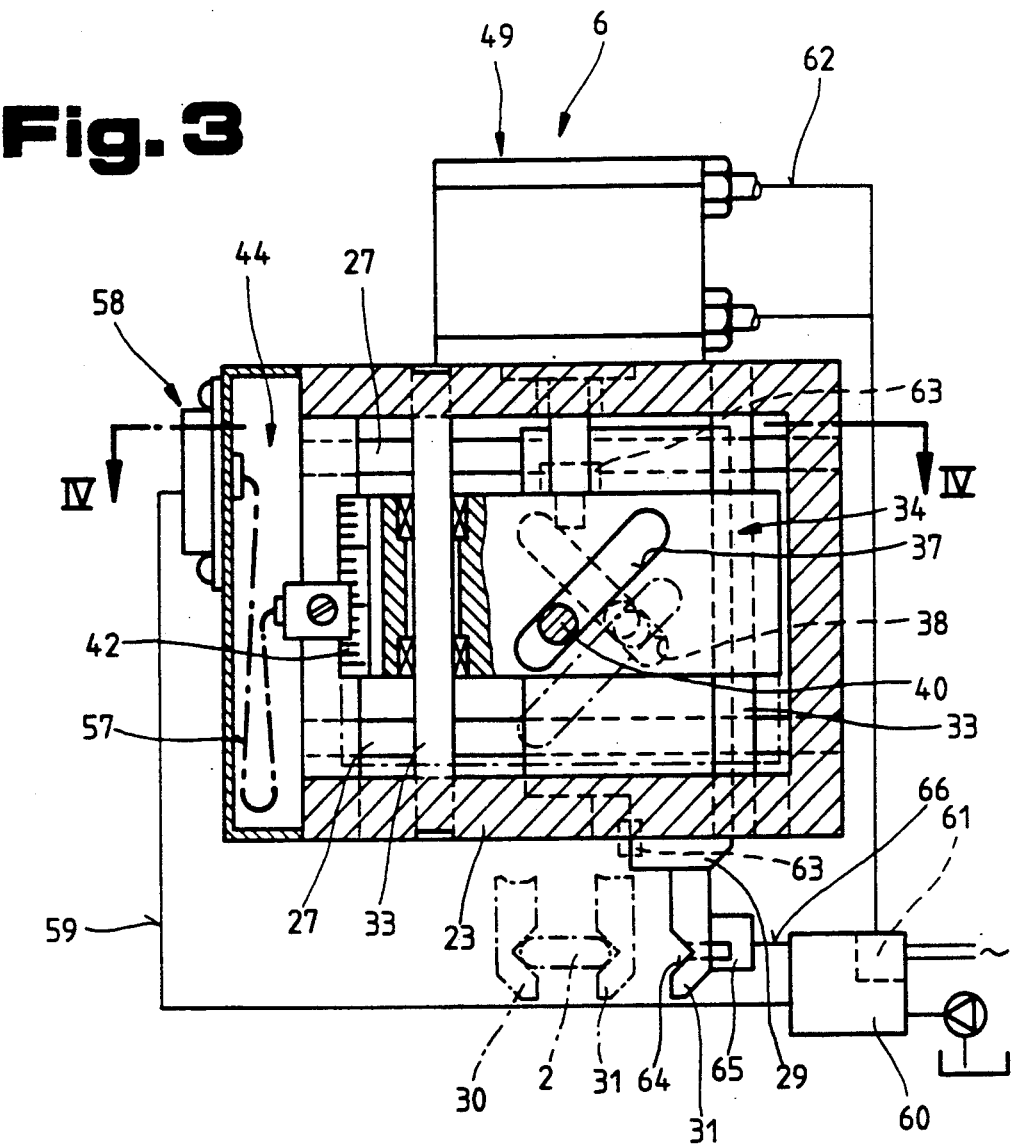
FIG. 3 shows the gripper device according to FIG. 1 in side view in section along line III—III of FIG. 4.

If the adjusting element 34, as indicated diagrammatically in FIG. 3 by dot-and-dash lines, is lowered into the lower position lying closest to bracing cross-piece 23, sliding blocks 40,41 slide along connecting guide paths 37,38 and each gripper finger 28,29 which gripped insert 30,31 is displaced into the position which is likewise drawn in dashed lines in FIGS. 3 and 4. The intersecting connecting link guide paths 37,38 cause each of the two gripper fingers 28,29 to be displaced in an opposite direction, so that the gripper fingers 28,29 and gripper inserts 30,31, move towards each other to close or apart to open. The extent of the respective displacement movement can be monitored by means of the glass scale 42 of the measuring device 44. The advantage of this arrangement lies in that the position of only one movable component is monitored, the distance shown on the glass scale 42 corresponding to half the distance between the gripper inserts 30,31. The glass scale 42 is scanned by the displacement pickup 46, which is arranged inside the u-shaped section 47, and the transparent scale can be illuminated in order to scan the scale lines. Through this arrangement, an operation is achieved which is shielded from outside light, and merely the position of one single moving part has to be monitored, in order to monitor the relative position of the gripper fingers 28,29 and their gripper inserts 30,31. The displacement pickup 46 is connected via a cable 57 with a coupling device 58, e.g. a plug, which may be connected via a reciprocally identical coupling piece and a cable 59 with a central control device 60. This control device 60 may also comprise a servo valve 61, which may be connected via a line 62 or several lines with the adjusting drive 6, which is formed by a cylinder/piston arrangement 49. Thereby the action upon the adjusting drive 6 can be controlled exactly as a function of the measured values determined by the measuring device 44.

Independently of the fact that by means of this measuring device 44 the gripper inserts 30,31 may be displaced to predeterminable distances, in order, for example, to carefully grasp parts which are easily deformable, it is also possible to determine the respective dimension of a structural part 2, so that incorrect parts or faulty parts with incorrect dimensions can be eliminated. Likewise, it is also possible to pre-sort the components in accordance with the respective measurement result, or to use parts which are graded to preset tolerance values.

The gripper fingers 28,29 and the gripper inserts 30,31 may, as indicated diagrammatically, be connected by measured value pickups 63, or measured value pickups 63 may be arranged between these parts. It is also possible to arrange a measured value pickup 65 in a gripper face 64 of a gripper insert 30 or respectively 31, which measured value pickup 65 is connected via a line 66 with the control device 60. The measured value pickups 63 or respectively 65 can be formed by pressure- and/or force- and/or motion sensors of conventional construction, e.g wire strain gauges, displacement measuring elements, pressure elements or the like. Thereby, the force with which the gripper inserts 30,31 or of gripper fingers 28,29 are applied against a structural part 2 can be precisely determined in advance.

Of course it is also possible to arrange such measured value pickups, as shown diagrammaticaly, only in the region of the gripper face 64 or also additionally between the gripper inserts 30,31 and the gripper fingers 28,29 or between the adjusting element 34 and the gripper fingers 28,29 or the adjusting element 34 and the adjusting drive 6.

Figures 5, 6:
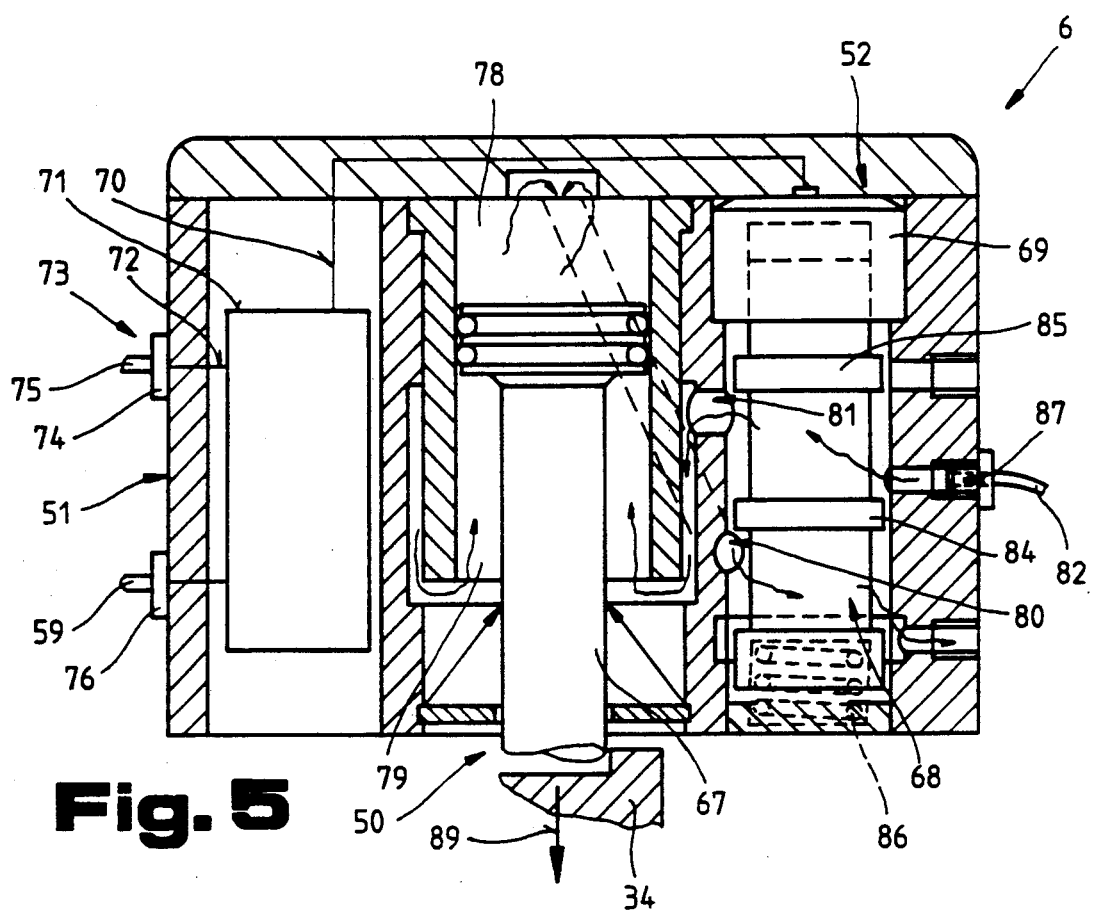
FIG. 5 shows the valve arrangement of the gripping device according to the invention in side view, partially in section.
FIG. 6 shows a switching diagram of the control device of the gripping device in simplified diagrammatic representation.

In FIG. 5 an embodiment of the adjusting drive 6 is illustrated, in which in a housing 51 a cylinder/piston arrangement 50 and the valve arrangement 52 are arranged together. As can be seen, a piston rod 67 of the cylinder/piston arrangement 50 is arranged parallel to a piston rod 68 of the valve arrangement 52. The piston rod 68 of the valve arrangement 52 is connected with a servo drive 69, which may be connected via a line 70 with a control module 71, which may likewise be arranged in the housing 51. The control module 71 is connected via a line 72 with a coupling device 73, which may be provided via a plug 74 and a supply line 75 with control device 60 or an energy supply system, both for the electrical and also the fluidic supply. Of course, the coupling devices 73 for the electric supply, and the supply of the pressure fluid may be arranged separately from each other. Via a further coupling device 76, the measuring device 44 can also be directly connected with the control module 71 via the cable 59.

In FIG. 6, a switching diagram is represented for the accurate servo displacement of the adjusting element 34, in greatly simplified diagrammatic form. For a better understanding of the mode of operation of the adjusting drive, in the description thereof hereinbelow, reference is made both to FIG. 5 and also to FIG. 6.

In FIG. 6, adjusting drive 6 is illustrated diagrammatically as a cylinder/piston arrangement. This comprises a piston rod 67 and a piston 77 which subdivides the cylinder into two cylinder chambers 78 and 79. The cylinder chamber 78 is in communication with ambient air via a line 80 and the valve arrangement 52. Opposite cylinder chamber 79 has an annular cross-section, the surface area of which is preferably 50% of the cross-sectional surface area of the cylinder chamber 78, and is connected via a channel 81 and a line 82 with a pressure source 83 for the fluid which is under pressure, preferably compressed air. Via the servo drive 69 and the control module 71 or respectively the control device 60, which may be connected with the servo drive 69 with the interposition of the control module 71, or directly, the piston rod 68 is displaced with its control piston 84 and 85 so far against the action of a restoring member 86 that the control pistons 84 and 85 assume the position drawn in solid lines. This causes control piston 84 to interrupt the connection of the channel 81 with the line 82 and to produce a pressure medium connection between line 87 and the cylinder chamber 79. The line 87 is supplied with pressure medium via a pressure reducing valve 88 from the pressure source 83. Through a corresponding setting of the valve arrangement 52 or action by the servo drive 69, the pressure of the fluid in the cylinder chamber 78 can be lower or higher than approximately half the pressure in the cylinder chamber 79. This is because the effective piston surface in the cylinder chamber 78 is twice as great as in the cylinder chamber 79. If the pressure in the cylinder chamber 78 is kept at approximately 50% of the pressure in the cylinder chamber 79, then the position of the piston rod 67 is fixed. If the pressure in the cylinder chamber 78 is increased, the piston rod 67 moves in the direction of the adjusting element, i.e. according to arrow 89, whereas with a reduction to the pressure in the cylinder chamber 78 through the counter-pressure built up in the cylinder chamber 79, the piston rod 67 is displaced in a direction opposed to the arrow 89.

As is additionally indicated in the switching diagram according to FIG. 6, the adjusting element 34 or the gripper fingers 28,29 or the gripper inserts 30,31 can be provided with a measured value pickup 65 constructed as a force sensor, in order to alter or control the force with which the gripper insert 31 or 30 is applied against the structural part 2. This measured value pickup 65 may, however, at the same time also be used to establish whether a structural part 2 has been grasped by the gripper inserts 30,31 or gripper fingers 28,29.

Through the measuring device 44, which cooperates with the piston rod 67 or the adjusting element 34 connected therewith, the position of the piston rod 67 or of the adjusting element 34 can be monitored continuously, so that it is possible, depending on whether each of the two gripper fingers is associated with its own or a common adjusting drive, to displace the individual gripper fingers 28,29 or their gripper inserts 30,31 into a particular pre-selectable position. On the other hand, however, it is also possible to operate without preset measured values and to merely move the gripper inserts 30,31 together until they have grasped a component 2. Then the distance between these gripper inserts 30 and 31 can be determined, in order to establish an actual dimension of the component 2, and to compare it with a nominal dimension.

Instead of the guide paths for the gripper fingers 28,29 or the adjusting element 34, shown in particular in FIGS. 2 to 4 and formed by guide columns 26,27,33 any other guide paths may be used, such as dovetail guides, roller guides or the like. Preferably, however, ball bearings are used, in order to make possible a precise and smooth course of the gripper fingers 28,29.

We claim:

1. An arrangement for handling structural parts, which comprises a gripping device displaceable along a guide path, a displacing drive connected to the gripping device for displacing the gripping device along the guide path, and the gripping device comprising two gripping fingers having facing and parallel gripping faces adjustable relative to each other in a direction perpendicular to the guide path, an adjusting element mounted between the facing gripping faces, a fixed housing slidably supporting the adjusting element, an adjusting drive mounted on the housing and connected to the adjusting element for slidably adjusting the adjusting element, a link guide arrangement linking the gripping fingers to the adjusting element for relative adjustment of the gripping faces relative to each other and while they remain in parallel relationship upon slidably adjusting the adjusting element, and a device for measuring the distance between the gripping faces, the measuring device comprising a liner measuring scale element and a pickup element monitoring the linear measuring scale element, one of the measuring device elements being mounted on the slidable adjusting element and the other measuring device element being mounted on the fixed housing.

2. The arrangement of claim 1, wherein the linear measuring scale element is mounted on the adjusting element and is a transparent scale.

3. The arrangement of claim 2, wherein the fixed housing is U-shaped and has two shanks and a base interconnecting the shanks, the adjusting element is slidably mounted between the shanks and the pickup element is mounted in a recess in one of the shanks of the U-shaped housing.

4. The arrangement of claim 3, further comprising a bracing cross-piece interconnecting the ends of the shanks remote rom the base.

5. The arrangement of claim 4, further comprising guide columns mounted on the cross-piece and extending perpendicularly to the base for slidably supporting the adjusting element.

6. The arrangement of claim 3, wherein the adjusting drive is mounted on a surface of the base facing away from the cross-piece.

7. The arrangement of claim 1, wherein the adjusting drive is a fluid-operated drive, and further comprising a housing for the fluid-operated drive and a valve arrangement mounted in the housing for controllably supplying a pressure fluid to the adjusting drive.

8. The arrangement of claim 7, further comprising a control module mounted in the housing for controlling the fluid-operated drive.

9. The arrangement of claim 1, further comprising replaceable gripping inserts mounted on the gripping fingers.

10. The arrangement of claim 9, further comprising a pressure sensor connected to at least one of the gripping inserts for sensing the grasping force on a structural part grasped by the gripping inserts.

11. The arrangement of claim 1, wherein the adjusting drive is a fluid-operated drive comprising a cylinder, a piston slidable in the cylinder and a piston rod, the piston having opposite faces and dividing the cylinder into two chambers, and the piston rod extending through one of the cylinder chambers, the piston face in the one cylinder chamber having a surface area of substantially half the size of the piston face in the other cylinder chamber, the piston face in the one cylinder chamber being subjected to a predetermined constant pressure of the fluid while the piston face in the other cylinder chamber is subjected to an adjustable pressure for adjusting the relative spacing between the gripping faces.

* * * * *